un007873038B2

(12) United States Patent
LaVigne et al.

(10) Patent No.: US 7,873,038 B2
(45) Date of Patent: Jan. 18, 2011

(54) PACKET PROCESSING

(75) Inventors: Bruce E. LaVigne, Roseville, CA (US);
Mark Gooch, Roseville, CA (US); **Alan
R. Albrecht**, Granite Bay, CA (US);
Paul T. Congdon, Granite Bay, CA (US)

(73) Assignee: **Hewlett-Packard Development
Company, L.P.**, Houston, TX (US)

( * ) Notice: Subject to any disclaimer, the term of this
patent is extended or adjusted under 35
U.S.C. 154(b) by 381 days.

(21) Appl. No.: 11/796,971

(22) Filed: Apr. 30, 2007

(65) Prior Publication Data
US 2008/0267179 A1 Oct. 30, 2008

(51) Int. Cl.
*H04L 12/28* (2006.01)
(52) U.S. Cl. .......................... 370/389; 370/400
(58) Field of Classification Search .............. None
See application file for complete search history.

(56) References Cited
U.S. PATENT DOCUMENTS

| 6,763,018 | B1 | 7/2004 | Puthiyandyil et al. |
| 6,785,286 | B1* | 8/2004 | O'Keeffe et al. ............ 370/397 |
| 7,103,045 | B2 | 9/2006 | Lavigne et al. |
| 7,111,072 | B1 | 9/2006 | Matthews et al. |
| 7,159,242 | B2 | 1/2007 | Genty et al. |
| 2005/0114522 | A1 | 5/2005 | LaVigne et al. |
| 2005/0220091 | A1 | 10/2005 | LaVigne et al. |
| 2005/0220092 | A1 | 10/2005 | LaVigne et al. |
| 2006/0056297 | A1* | 3/2006 | Bryson et al. ............ 370/230 |
| 2006/0143300 | A1* | 6/2006 | See et al. ............ 709/227 |
| 2007/0230369 | A1* | 10/2007 | McAlpine ............ 370/256 |
| 2008/0031266 | A1* | 2/2008 | Tallet et al. ............ 370/401 |

* cited by examiner

*Primary Examiner*—Chirag G Shah
*Assistant Examiner*—Nima Mahmoudzadeh

(57) ABSTRACT

Network devices, systems, and methods are provided for packet processing. One network device includes a network chip including logic and a number of network ports for the device for receiving and transmitting packets therefrom. The logic is operable to group a number of ports into a membership group based on a criteria, and define a filter index in association with a network packet to indicate the membership group.

14 Claims, 8 Drawing Sheets

|  | | 540-1 | 540-2 | 540-3 | 540-N |
|---|---|---|---|---|---|
|  | |  CHIP 1  |  CHIP 2  |  CHIP 3  |  CHIP 4  |
| 570 – VLAN_IDX 1 | ⇒ | 1 1 1 1 | 1 1 1 1 | 0 0 | 0 0 0 0 |
| 574 – IN_LOGPORT MATCH | ⇒ | 0 1 1 1 | 1 1 1 1 | 1 1 | 1 1 1 1 |
|  | | ⋮ | ⋮ | ⋮ | ⋮ |
| 575 – FILTER RESULTS BEFORE SA_SPARE | ⇒ | 0 1 1 1 | 1 1 1 1 | 0 0 | 0 0 0 0 |
| 525 – SA_SPARE_IDX 4 | ⇒ | 1 0 1 0 | 0 1 0 0 | 1 0 | 0 1 0 0 | *
| 576 – RESULTING PORT MASK | ⇒ | 0 0 1 0 | 0 1 0 0 | 0 0 | 0 0 0 0 |
| 577 – PORTS MASKED BY SA_SPARE | ⇒ | 0 1 0 1 | 1 0 1 1 | 0 0 | 0 0 0 0 |

*Fig. 5B*

|  | | 540-1 | 540-2 | 540-3 | 540-N |
|---|---|---|---|---|---|
|  | |  CHIP 1  |  CHIP 2  |  CHIP 3  |  CHIP 4  |
| 570 – VLAN_IDX 1 | ⇒ | 1 1 1 1 | 1 1 1 1 | 0 0 | 0 0 0 0 |
| 574 – IN_LOGPORT MATCH | ⇒ | 0 1 1 1 | 1 1 1 1 | 1 1 | 1 1 1 1 |
|  | | ⋮ | ⋮ | ⋮ | ⋮ |
| 575 – FILTER RESULTS BEFORE SA_SPARE | ⇒ | 0 1 1 1 | 1 1 1 1 | 0 0 | 0 0 0 0 |
| 578 – SA_SPARE_IDX 4 (INVERTED) | ⇒ | 0 1 0 1 | 1 0 1 1 | 0 1 | 1 0 1 1 | *
| 579 – RESULTING PORT MASK | ⇒ | 0 1 0 1 | 1 0 1 1 | 0 0 | 0 0 0 0 |

*Fig. 5C*

PACKET PROCESSING

BACKGROUND

Computing networks can include multiple network devices such as routers, switches, hubs, servers, desktop PCs, laptops, and workstations, and peripheral devices, e.g., printers, facsimile devices, and scanners, networked together across a local area network (LAN) and/or wide area network (WAN).

Networks can include a network appliance (NA), e.g., intrusion prevention system (IPS) and/or intrusion detection system (IDS) that serves to detect unwanted intrusions/activities to the computer network. Unwanted network intrusions/activities may take the form of attacks through computer viruses and/or hackers, among others, trying to access the network. To this end, a NA can identify different types of suspicious network traffic and network device usage that can not be detected by a conventional firewall. This includes network attacks against vulnerable services, data driven attacks on applications, host based attacks such as privilege escalation, denial of service attacks, port scans, unauthorized logins and access to sensitive files, viruses, Trojan horses, and worms, among others. A NA can also include other forms of diagnostic devices, accounting devices, counting devices, etc., operable on network packets of interest.

In previous approaches, to identify suspicious network traffic or to properly account for the traffic, data traffic needed to pass through a point of the network where a NA is located. That is, network appliances used to be solely deployed as in-line devices, and recently have become a shared resource local to one network device, e.g., switch, router, etc. If the NA is not "in-line", e.g., between one port and another in a network packet's intended path, then suspicious activity may not be detected, or the packets properly counted. For large network systems, placing a NA in-line with all possible network packet intended paths can be both expensive to implement and very complex to maintain.

Network appliances, e.g., IPS/IDSs, counting/accounting, or diagnostic devices, may be slower than other network devices, such as switches and routers. To improve bandwidth it would be useful to determine a subset of network traffic of particular interest to monitor in a manner which does not diminish the functionality of a NA, but allows the NA to operate on a greater number of ports, users, etc.

In previous approaches, IP subnets and virtual local area networks (VLANs), as the same are known by one of ordinary skill in the art, were used to address the above issue. In this approach only data packet traffic crossing a layer 2, e.g., bridged, domain would be sent to the router, which may apply additional security, accounting, or diagnostic checks. However, in today's networks group membership is not always easily divided among subnets or VLANs. More useful group membership is often based on a user's identity (e.g., MAC address, IP address), physical location (e.g., physical connect point within the network), traffic type (e.g., the type of resources being accessed), etc.

BRIEF DESCRIPTION OF THE DRAWINGS

FIGS. 5A-5C illustrates logical operations on indexed filters, e.g., port masks, according to embodiments of the present invention.

DETAILED DESCRIPTION

Figure 1:
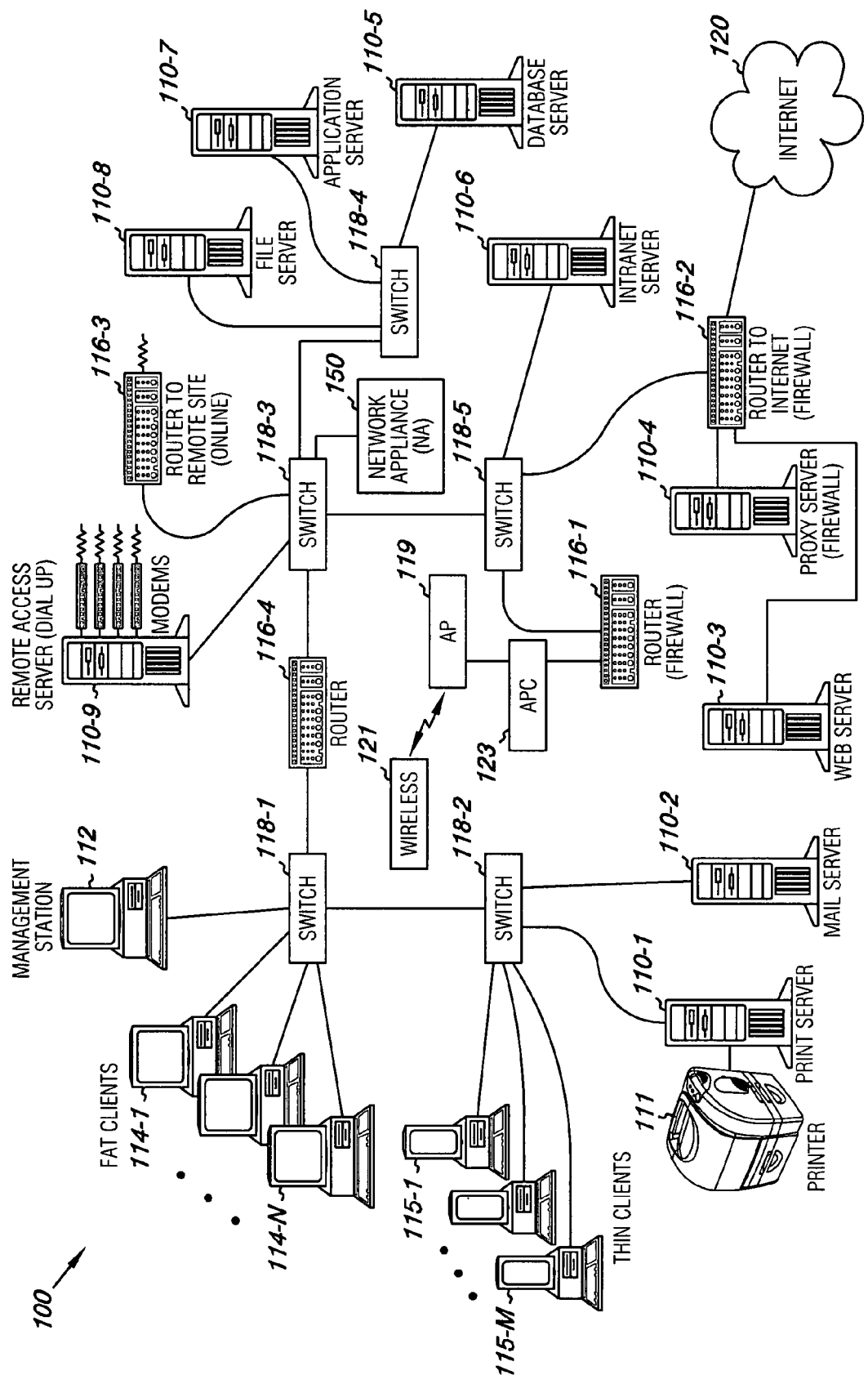
FIG. 1 is an example of a computing device network in which certain embodiments of the invention can be implemented.

The embodiments include network devices, systems, and methods, including executable instructions, which may be used to identify packets crossing membership boundaries. According to one embodiment a network device includes network chip having logic and a number of network ports for the device for receiving and transmitting packets therefrom. The logic is operable to group a number of ports into a membership group based on a criteria. The logic is further operable to define a filter index in association with a network packet to indicate the membership group.

In some embodiments, ports are grouped into sets of membership groups such that packet communication between members of the same group are considered "safe" or "uninteresting", and not sent to a checking functionality, local or otherwise. However, whenever a member of one group communicates with an entity outside the group, the checking functionality is invoked to ensure correct policies are followed.

As used herein, "checking functionality" (CF) means an intrusion prevention system (IPS), an intrusion detection system (IDS), and can also include other forms of diagnostic devices, accounting devices, counting devices, etc., operable on network packets of interest, whether connected as a network appliance (e.g., 250-1 or 250-2 as described in connection with FIG. 2) or whether provided as logic integral to a particular network device (e.g., 241, 270, 260, or 265, as described in connection with FIG. 2).

A checking functionality can include a network appliance supplied by a third party vendor of network security devices or otherwise. As used herein, the term "network appliance" is used to mean an add-on device, e.g., "plug-in" or "application module" (as defined below), to a network as contrasted with a "network device", e.g., router, switch, and/or hub, etc., which are sometimes considered more as "backbone" component devices to a network. The operations of such devices will be recognized and understood by one of ordinary skill in the art. A checking functionality can be provided in the form of software, application modules, application specific integrated circuit (ASIC) logic, and/or executable instructions operable on the systems and devices shown herein or otherwise.

"Software", as used herein, includes a series of executable instructions that can be stored in memory and executed by the hardware logic of a processor (e.g., transistor gates) to perform a particular task. Memory, as the reader will appreciate, can include random access memory (RAM), read only memory (ROM), non-volatile memory (such as Flash memory), etc.

An "application module" means a self-contained hardware or software component that interacts with a larger system. As the reader will appreciate a software module may come in the form of a file and handle a specific task within a larger software system. A hardware module may be a separate set of logic, e.g., transistor/circuitry gates, that "plug-in" as a card, appliance, or otherwise, to a larger system/device.

In some embodiments, logic in the form of hardware, e.g. application specific integrated circuits (ASICs) on a network chip, receives a network packet. The logic processes packets on ingress to the chip to determine a number of filter indices, which are then used on egress to determine to which port(s) a packet should be sent. According to some embodiments, a particular "filter index" (e.g., "membership" filter index, described in more detail in FIG. 4) is used to determine a port mask, which is used to indicate a particular port is a member of a particular membership group. The logic may derive some filter indices associated with a particular packet based on the packet's source/destination port information, media access controller (MAC) information, internet protocol (IP) lookups, access control list (ACL) entries, etc.

On egress the membership port mask, as referenced by the index, is re-applied with other filter indices before a packet is sent out to other ports. If any port is filtered out due to the membership port mask, then a boundary of a membership group has been crossed. While the packet will still be allowed to be sent to any ports which are members of the membership group, the particular data packet crossing a boundary of the membership group may optionally be filtered from any non-member port(s), and an indication returned so the packet may be sent, e.g., "mirrored", to the checking functionality.

If the checking functionality is an IPS or similar device, the checking functionality may wish to allow the packet to be forwarded after it passes any checks associated with the checking functionality, e.g., is "cleared". According to embodiments, the cleared packet is not allowed to go to all possible destinations, since the member ports would then receive a duplicate packet. By indicating the cleared packet is being "re-forwarded" using the same filters, the egress logic can invert the membership filter value (port mask), and send the cleared packet only to the port(s) which were denied on the first attempt.

In this manner, the limited bandwidth of a checking functionality may be more efficiently used while at the same time not requiring the network topology to be constrained by artificial subnet and/or VLAN boundaries.

As used herein, a "network" can provide a communication system that links two or more computers and peripheral devices, and allows users to access resources on other computers and exchange messages with other users. A network allows users to share resources on their own systems with other network users and to access information on centrally located systems or systems that are located at remote offices. It may provide connections to the Internet or to the networks of other organizations. Users may interact with network-enabled software applications to make a network request, such as to get a file or print on a network printer. Applications may also communicate with network management software, which can interact with network hardware to transmit information between devices on the network.

FIG. 1 illustrates an embodiment of a computing device network 100 in which some embodiments of the invention can be implemented. As shown in FIG. 1, a number devices can be networked together in a LAN, WAN and/or metropolitan area network (MAN) via routers, hubs, switches and the like. As used herein a "network device" means a switch, router, hub, bridge, etc., e.g., a device which may have a processor and memory resources, and is connected to a network 100, as the same will be understood by one of ordinary skill in the art. Although a switch will often be used in this disclosure in describing certain embodiments of the invention, those skilled in the art will realize that embodiments may be implemented with other network devices. As the reader will appreciate, the term network device can also be used to refer to servers, PCs, etc., as illustrated further below.

The example network of FIG. 1 illustrates a print server 110-1 and printer 111 to handle print jobs for the network 100, a mail server 110-2, a web server 110-3, a proxy server (firewall) 110-4, a database server 110-5, an intranet server 110-6, an application server 110-7, a file server 110-8, and a remote access server 110-9. The examples described here do not provide an exhaustive list of servers that may be used in a network.

The network embodiment of FIG. 1 further illustrates a network management station 112, e.g., a server, PC and/or workstation, a number of "fat" clients 114-1, . . . , 114-N which can also include PCs and workstations and/or laptops, and a number of "thin" clients 115-1, . . . , 115-M. As used herein a "thin client" can refer to a computing device that performs little or no application processing and functions more as an input/output terminal. That is, in this example, a thin client generally relies on the application processing being performed on a server networked thereto. Additionally, a thin client can include a client in a server/client relationship which has little or no storage, as the same will be understood by one of ordinary skill in the art. In contrast, a "fat client" is generally equipped with processor and memory resources, to perform larger application processing and/or storage.

The designators "N" and "M" are used to indicate that a number of fat or thin clients can be attached to the network 100. The number that N represents can be the same or different from the number represented by M. The embodiment of FIG. 1, illustrates that all of these example network devices can be connected to one another and/or to other networks using routers, 116-1, 116-2, 116-3, and 116-4, and hubs and/or switches 118-1, 118-2, 118-3, 1184, and 118-5. As noted above, such network devices can include a processor in communication with a memory and may include network chips having hardware logic, e.g., in the form of application specific integrated circuits (ASICs), associated with the number of network ports. The term "network" as used herein is not limited to the number, type, and/or quantity of network devices illustrated in FIG. 1.

Additionally as the reader will appreciate, a number of mobile devices, e.g., wireless device 121, can connect to the network 100 via a wireless air interface (e.g., 802.11) which can provide a signal link between the mobile device 121 and an access point (AP) 119. The AP 119 serves a similar role to a base station in a wireless network, as the same will be known and understood by one of ordinary skill in the art. As shown in FIG. 1, the AP 119 can be linked to an access point controller (APC) 123, as the same will be known and understood by one of ordinary skill in the art, which connects the AP 119 over a packet switched signal link, e.g. an Ethernet link, to other network devices, e.g., router 116-1.

Program instructions (e.g., computer executable instructions), as described in more detail here, can reside on some network devices. For example, program instructions in the form of firmware, application modules, and/or software (both in the form of executable instructions) can be resident on the network 100 in the memory of a network management station 112 and/or one or more routers, 116-1, 116-2, 116-3, 116-4, hubs, and/or switches 118-1, 118-2, 118-3, 118-4, 118-5, etc., and can be executable by the processor(s) and/or logic (e.g., hardware in the form of transistor gates) thereon. Also, program instructions can be resident in a number of locations on some network devices in the network 100 as can be employed in a distributed computing network. A "distributed computing network" refers to the use of multiple computing devices, e.g., having processor and memory resources, in a network to execute various roles, e.g., application processing, etc., as described herein.

As one of ordinary skill in the art will appreciate, each network device in the network 100 can be physically associated with a port of a switch to which it is connected. Information in the form of network packets, e.g., data packets, can be passed through the network 100. Users physically connect to the network through ports or APCs 123 on the network 100. Data frames, or packets, can be transferred between network devices by means of a network device's, e.g., switch's, logic link control (LLC)/media access control (MAC) circuitry, or "engines," as associated with ports on a network device. A network switch forwards network packets received from a transmitting network device to a destination network device based on the header information in received network packets. A network device can also forward packets from a given network to other networks through ports on one or more other network devices. As the reader will appreciate, an Ethernet network is described herein. However, embodiments are not limited to use in an Ethernet network, and may be equally well suited to other network types, e.g., asynchronous transfer mode (ATM) networks, etc.

According to embodiments described herein, a checking functionality, e.g., a network appliance intrusion system (IS) which serves to detect and/or evaluate suspicious activity, can be located in a "centralized" location in network 100. As used herein, the term "centralized" means a particular location in the network 100 accessible from a number of network devices, e.g., 118-1, . . . , 118-5, whether or not the topographical location is in-line with a given packet's intended network path or topographically central to the network 100. To further explain, in network 100 of FIG. 1, certain network devices, e.g., switches 118-1, 118-2, and 118-5, may be referred to topographically as "edge network devices" and other network devices, e.g., switches 118-3 and router 116-4, may be referred to topographically as "central network devices". As used herein, "edge network devices" topographically means network devices, e.g., 118-1, having ports connected directly to network clients, 115 and 114-1, . . . 114-N on the "edge" of a network. The network clients can include servers, "fat" and "thin" clients, including mobile network clients connected through an APC, etc., as discussed above. As used herein, "central network devices" topographically means network devices, e.g., 118-3, which are connected to other network devices, 118-2, but which are not necessarily connected directly to network clients such as 115 and 114-1, . . . 114-N, etc.

However, the term "central" in central network devices is not to be confused with the use of the term "centralized". In some embodiments, a "centralized" CF, as defined above, may be integral to or associated with an edge network device. That is, the topographical location in a given network of the CF can be in association with switch 118-1, connected to "fat" and "thin" clients, 114-1, . . . , 114-N, and 115-1, . . . , 115-M, in FIG. 1, or equally in association with switch 118-3, or switch 118-5, etc. Embodiments are not limited to the examples described herein. As one or ordinary skill in the art will appreciate, the intent is to place an CF in a topographical location in network 100 which has a sufficiently high bandwidth associated therewith relative to the bandwidth of other devices attached to the network 100 to perform a sufficient throughput associated with a particular CF. As the reader will appreciate, certain so termed "edge network devices", e.g., switch 118-1, may in fact have a large network packet traffic bandwidth capability relative to other network devices, e.g., 118-3, 118-4, etc., in the network 100 so as to be worthwhile candidates for associating a CF therewith. Embodiments are not limited to the examples given in connection with FIG. 1.

In the example network implementation of FIG. 1, a network appliance 150 is shown in association with switch 118-3. The network appliance 150 serves as a checking functionality. As the reader will appreciate, a network appliance 150 can include processor and memory resources capable of storing and executing instructions to perform a particular role or function. A network appliance can also include one or more network chips (e.g., ASICs) having logic and a number of ports.

In certain embodiments, the checking functionality performed by the network appliance 150 can perform the role of an intrusion prevention system (IPS), as may be supplied by a third party vendor of network security devices. In certain embodiments, the checking functionality performed by the network appliance 150 can perform the role of an intrusion detection system (IDS), or another diagnostic device, accounting device, counting device, etc., as may be supplied by a third party vendor. Embodiments are not limited to the examples given here. The various configurations and operations of such different checking functionalities are known and understood by one of ordinary skill in the art.

Figure 2:
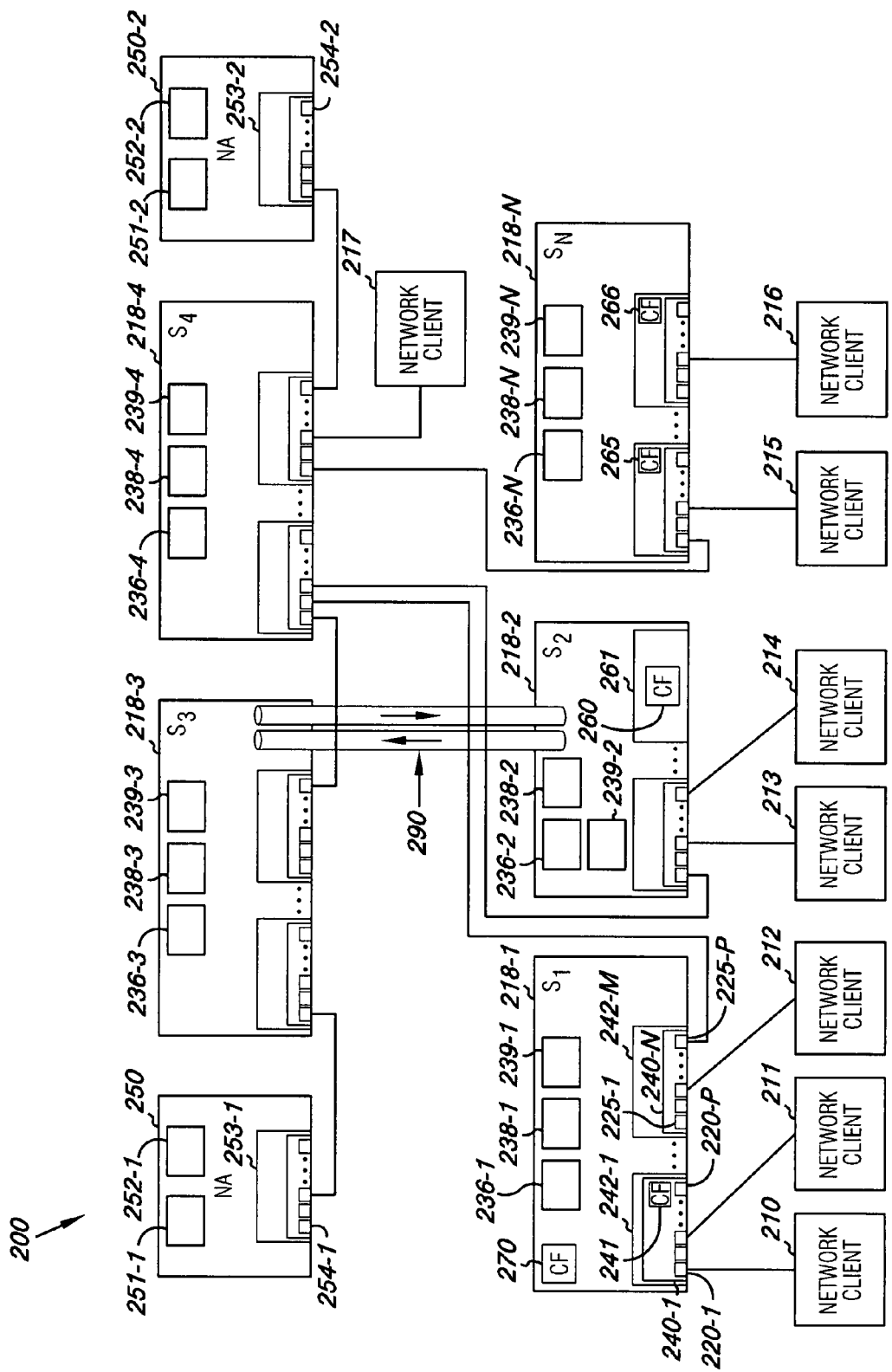
FIG. 2 illustrates a portion of a network, such as shown in FIG. 1, which includes network devices in which certain embodiments of the present invention can be implemented.

FIG. 2 illustrates a portion 200 of a network, e.g., network 100 shown in FIG. 1, including embodiments of network devices, 218-1, 218-2, . . . 218-N suited to implement embodiments of the present invention. By way of illustration and not by way of limitation, some of the network devices are "edge network devices", e.g., 218-1, having ports connected directly to network clients, 210, . . . , 217. The network clients can include "fat" and "thin" clients, including mobile network clients connected through an APC 123, etc., as discussed above in connection with FIG. 1. Additionally, by way of illustration and not by way of limitation, some of the network devices are "central network devices", e.g., 218-3 which are connected to other network devices, e.g., 218-4, but which are not be connected directly to network clients, 210, . . . , 217, mobile devices, etc.

As described in connection with FIG. 1, the network devices, 218-1, 218-2, . . . 218-N, of FIG. 2 can include switches, routers, hubs, etc. (shown as switches in FIG. 2). Such network devices, 218-1, 218-2, . . . 218-N, can include processor, e.g., 236-1, . . . , 236-N, and memory, e.g., 238-1, . . . , 238-N, resources. The network devices, 218-1, 218-2, . . . 218-N, can similarly include a number of printed circuit boards, or "blades", 242-1, . . . , 242-M, which can include a number of network chips, e.g., 240-1, . . . , 240-N, including logic circuitry (hardware). Each network chip, 240-1, . . . , 240-N, can include a number of network ports, 220-1, 220-2, . . . , 220-P to send and receive data packets (network traffic) throughout the network 200. The logic circuitry of the number of network chips, e.g., 240-1, . . . , 240-N, can be in the form of an application specific integrated circuit (ASIC) and include logic to serve as a media access controller (MAC).

As shown in FIG. 2, the number of ports 220-1, 220-2, . . . , 220-P can be included on a network chip 240-1, . . . , 240-N and have access to logic circuitry associated with any of the network chips 240-1, . . . , 240-N and to the processor 236-1, . . . , 236-N and memory 238-1, . . . , 238-N through a crossbar, crosslink, and/or switching fabric 239-1, . . . , 239-N as the same will be understood by one of ordinary skill in the art. As used herein, the designators "M", "N", and "P" are used to illustrate that networks can have a number of network devices, that a given network device may have a number of blades, and that the network devices may support or contain a different number of ports. Embodiments are not limited to the example shown in FIG. 2.

As shown in the embodiment of FIG. 2, network appliances 250-1 and 250-2 can be connected to a network device in a centralized location. The centralized location may be connected to a central network device, e.g., 218-3 (network device not connected directly to network clients), or may be connected to an edge network device, e.g. 218-4 (network device connected directly to network clients). As shown in FIG. 2, a given network appliance 250-1 can include processor 251-1 and memory 252-1 resources capable of storing and executing instructions to perform a particular role or function. The network appliance can also include one or more chips (ASICs), e.g., 253-1, having logic and a number of ports 254-1, as the same have been described above.

The network appliances 250-1 and 250-2 serve as a checking functionality. As also shown in the embodiment of FIG. 2, in some embodiments, a checking functionality (CF) may be embedded, either within a network device's ASIC (e.g., 241), or on the port blades (265, 266), or just within the network device itself, either as a plug-in blade (e.g., CF 260 on plug-in blade 261), or built in to the network device (e.g., 270). Embodiments of the invention are not limited to the actual location of the checking functionality with the network 200.

As described in connection with FIG. 1, the CF can be an intrusion detections system (IDS), or another diagnostic device, accounting device, counting device, etc., as may be supplied by a third party vendor of network checking devices. Embodiments are not limited to the examples given here.

In the embodiment of FIG. 2, a network packet, e.g., data packet, is received by a port, e.g., 220-1, on a network device, e.g., switch 218-1, from a network client, e.g., 210. According to embodiments, logic on the network device 218-1, e.g., associated with an ASIC of a network chip 240-1, can group a number of ports, 220-1, 220-2, . . . , 220-P, into a "membership group" based on some criteria (illustrated in more detail in connection with FIG. 3). The logic can define a filter index in association with a network packet based on the packet's membership group and use the membership group filter index to detect if the packet is attempting to cross a boundary of the membership group. As will be explained in more detail below, the logic can deny access to ports outside the membership group and "mirror-steal" (defined below) the packet to a checking functionality.

According to some embodiments, the number of ports, 220-1, 220-2, . . . , 220-P, can be grouped into a membership group based on criteria selected from the group of; a source/destination port pair, a media access controller (MAC) source address, an IP source address, an access control list (ACL) entry, etc. In this manner, logic can select original data packets, which are of particular interest, as received by a particular port, e.g., 220-1 on the device 218-1, and can filter and deny a packet's access to ports outside of the membership group.

According to embodiments, logic on the network chip 240-1 can mirror-steal a packet which is attempting to cross a boundary of a membership group to the network appliance 250-1, or any other CF (e.g., 241, 270, 260, etc.).

In some embodiments the logic will tunnel encapsulate selected, "mirror-stolen", data packets and can forward those packets to the network appliance 250-1 through a secure tunnel. As used herein the term "mirror-stealing" means the packet is denied access to ports outside of the membership group and a copy of the packet is forwarded to the CF, e.g., network appliance 250-1. "Mirror-stealing" additionally means that the logic does not prevent the packet from being forwarded to ports which are members of the membership group. One example of the manner in which a "mirror-stolen" packet can be forwarded to a network appliance is provided in a co-pending, commonly assigned U.S. patent application Ser. No. 11/712,706, entitled, "Packet Tunneling", by inventors Bruce LaVigne, et. al., filed Mar. 1, 2007, which is incorporated in full herein. The same is not described more fully herein so as not to obscure embodiments of the present invention.

The network appliance 250-1 may chose to drop a suspicious packet received from the mirror-stealing operation. However, if a packet passes the checking functionality applied by the network appliance 250-1, e.g., is "cleared", the logic of the network appliance will securely tunnel encapsulate the packet and can forward the packet to the originating switch, e.g., switch 218-1. One example of the manner in which the logic of the network appliance can securely tunnel encapsulate the packet and forward the packet to the originating switch is provided in a co-pending, commonly assigned U.S. patent application Ser. No. 11/788,179, entitled, "Marked Packet Forwarding", by inventors Bruce LaVigne, et. al., filed Apr. 19, 2007, which is incorporated in full herein. The same is not described more fully herein so as not to obscure embodiments of the present invention.

Upon arrival at the originating switch, this switch may re-forward the packet to be sent out ports to which the packet had previously been denied. One example of the manner in which an originating switch, e.g., 218-1, may forward a returned "mirror-stolen" packet to be sent out ports is provided in a co-pending, commonly assigned U.S. patent application Ser. No. 11/784,664, entitled, "Locating Original Port Information", by inventors Bruce LaVigne, et. al., filed Apr. 9, 2007, which is incorporated in full herein. The same is not described more fully herein so as not to obscure embodiments of the present invention.

According to embodiments of the present invention, the cleared packet is not allowed to go to all possible destinations, since the member ports would then receive a duplicate packet. To prevent this from occurring, the logic determines that the packet has been returned from a CF by examination of fields within the encapsulation header of the packet, e.g., the source and destination IP addresses as well as other fields necessary to correctly identify the packet, these fields being chosen depending on the type of encapsulation in use (e.g., TCP/UDP port numbers, GRE key field, etc.).

Figure 5A:
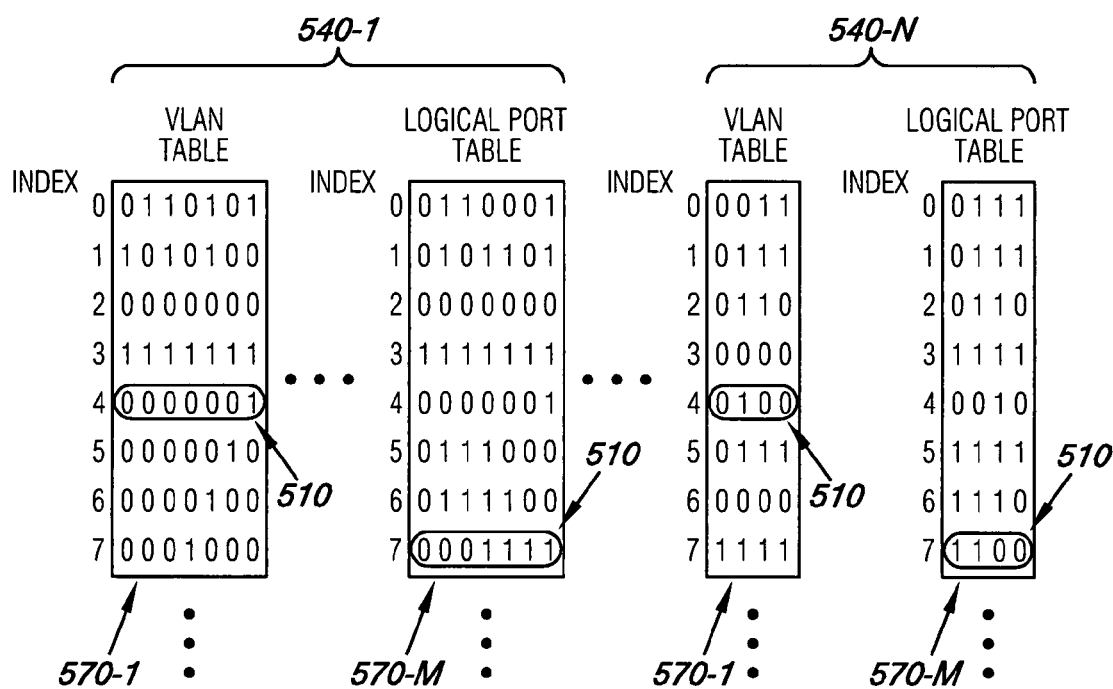
Figure 6A:
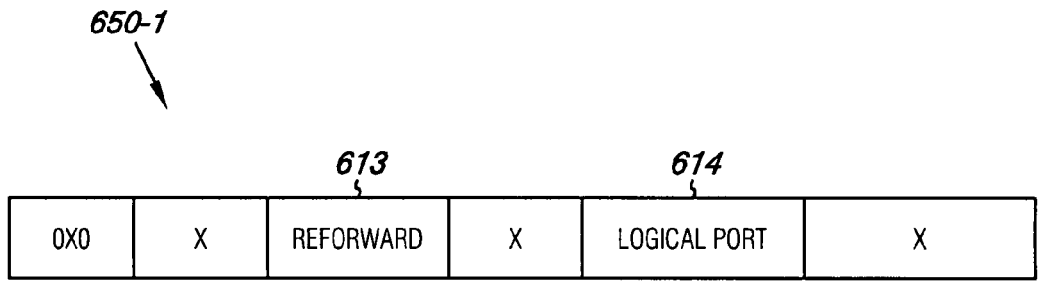
FIGS. 6A-6B illustrates an embodiment of a buffer request command.
Figure 6B:
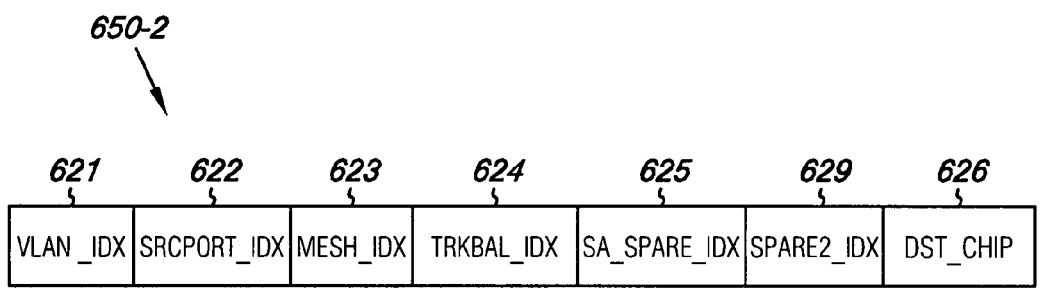

Once the logic has identified that the packet has been sent from a CF, e.g., network appliance 250-1, to the originating switch 218-1, it can indicate that the packet is being "re-forwarded" by setting a REFORWARD status bit, e.g., bit field 613 in FIGS. 6A-6B. Additionally, egress logic on the receiving chip (e.g., fabric receiver 460 described in connection with FIG. 4) may reapply the same membership group filter index originally used to detect that the packet was attempting to cross a boundary of the membership group. As described in more detail in connection with FIGS. 5A-5C, the egress logic on the receiving chip may invert the membership group filter value (port mask) to prevent the packet from being allowed to go to ports having already received the packet.

Figure 3:
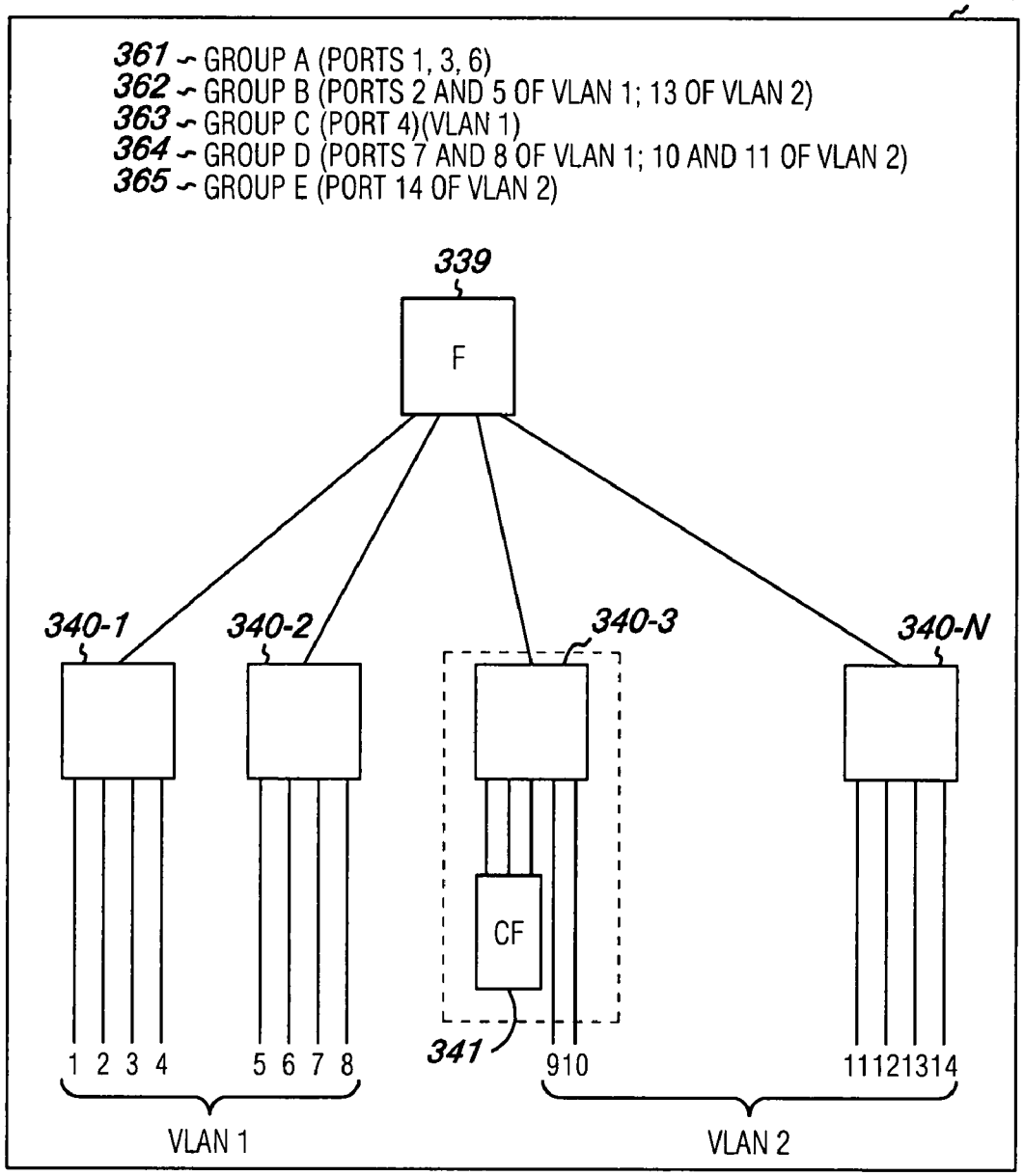
FIG. 3 is a block diagram embodiment logically illustrating components within a network device, such as network devices shown in FIG. 2.

Thus, according to embodiments of the present invention, packets may be selectively chosen for tunneling to the CF (e.g., network appliance 250-1 in FIG. 2) based on a packet crossing a boundary of a membership group. FIG. 3, described next, provides an example of the manner in which some ports can be separated by logic into membership groups in order to detect a packet attempting to cross a boundary of a membership group.

FIG. 3 is a block diagram embodiment logically illustrating components within a network device 318, such as network device 218-1 in FIG. 2. Although the illustration of FIG. 2 appears to illustrate one network chip, e.g., 240-1, per blade, e.g., 242-1, and two blades per network device, one of ordinary skill in the art will appreciate that a given network device 318 can include a number of blades, each having a number of network chips, and each chip having a number of network ports.

FIG. 3 logically represents a given network device 318 including a number of network chips, e.g., 340-1, 340-2, 340-3, . . . , 340-N, each having a number of network ports. Embodiments of the present invention are not limited to the division of which chips reside on which blades, etc. The designator "N" as used in FIG. 3 is intended to mean that embodiments are not limited to the number of network chips on a given network device 318. Further, embodiments are not limited to a particular number of ports on a given network chip. Hence, by way of illustration, and not by way of limitation, network chip 340-1 includes network ports 1, 2, 3, and 4. Network chip 340-2 includes network ports 5, 6, 7, and 8. Network chip 340-3 includes ports 9 and 10, as well as a number of ports dedicated to an internal or external additional network processing resource, e.g., checking functionality (CF) 341. Network chip 340-N includes network ports 11, 12, 13, and 14. The number of network ports on the network chips may vary from one network chip to another.

The embodiment of FIG. 3 is intended to illustrate one mechanism for moving packets to and from an additional network processing resource such as a checking functionality, e.g., CF 341 and/or network appliance 250-1 in FIG. 2. As mentioned in connection with FIG. 2, the CF 341 can be in the form of a dedicated blade, e.g., plug-in card 261 in FIG. 2, which plugs into one of the slots on a switch's chassis, or on port blades 265 and 266 in FIG. 2, or embedded within an ASIC on a given blade, e.g., 241 in FIG. 2, etc.

In the example embodiment of FIG. 3 the CF 341 is local to, e.g., resides on, the switch itself. Embodiments are not limited to whether the functionality of the CF 341 is local to a given network device, as shown in FIG. 3, or remote to a given network device, as in the case of the network appliance 250-1 in FIG. 2. Further, in addition to the location examples for the CF given above, the CF may be a separate chip (ASIC) attached to 340-3, but is still a part of the same plug-in blade (i.e., as illustrated by the dotted line in FIG. 3). In the above example in which the CF is on a separate plug-in blade to the chassis, e.g., 340-N, the blade having the CF may or may not have customer accessible network ports. Additionally, the CF may be a plug-in appliance, but is attached locally to the switch, e.g., it is a separate box which plugs into one of the 220-P ports on network device 218-1. Although shown locally in the embodiment of FIG. 3, the CF may alternatively be remote, i.e., as in the case of the network appliance 250-1 in FIG. 2.

In the example embodiment of FIG. 3, the CF blade 341 uses the existing ASIC logic of a network chip, e.g., 340-3, to connect into the switch. That is, the CF 341 functionality connects to MAC ports on network chip 340-3. As noted above, while the CF 341 hardware may reside within the switch logically, the CF 341 functions in analogous manner to connecting some number of external switch ports to a network appliance, such as network appliance 250-1 in FIG. 2.

As described in more detail below, embodiments provide some or all of the following advantages; the ability to pass results of all forwarding lookups to the CF 341; the ability to pass original, unmodified packet contents to the CF 341; the ability to redirect packets to the CF 341 based on a number of criteria, including source information, destination information, and/or source-destination pairing information ("IP flow"); the ability to send packets from the CF 341 to particular output ports, with correct formatting; and not burden the CF 341 processor with the internal table structures of the switch.

As the reader will appreciate, in existing network chip logic, packets may be egress-mirrored on the port or VLAN, causing a copy of the egressing packet to be sent to the mirror destination, e.g., CF 341 in FIG. 3 or network appliance 250-1 in FIG. 2. However, in previous approaches to egress mirroring, a packet would still be allowed to be sent out the original port(s). In contrast, the CF 341 embodiments described herein make it possible to "mirror-steal" certain packets before these packets are sent out certain ones of the original port(s). Hence, as used herein "mirror-stealing" a given packet means copying the packet, forwarding the copied packet to a mirror destination, and preventing the packet from being sent out certain ones of the original port(s) to which it would normally be sent. The CF 341 may then decide to re-forward the packet out of the original port(s) for which access was denied if the packet passes whatever checks, e.g., security checks, the CF 341 performs.

According to embodiments of the present invention, packets may be selectively chosen for forwarding to the CF 341 is based on a packet crossing a boundary of a membership group. To detect a packet attempting to cross a membership boundary, logic divides the ports into membership groups. The embodiment of FIG. 3 illustrates an example in which ports 1, 2, . . . , 14 are divided into particular membership groups. As shown in FIG. 3, ports 1, 2, 3, 4, 5, 6, 7, and 8 are in (i.e., members of) VLAN 1 and ports 9, 10, 11, 12, 13, and 14 are in (i.e., members of) VLAN 2. In the example embodiment of FIG. 3, a first membership group of ports 361 ("Group A") is defined to include ports 1, 3, and 6 of VLAN 1. A second membership group 362 ("Group B") is defined to include ports 2 and 5 of VLAN 1 and port 13 of VLAN 2. A third membership group 363 ("Group C") is defined to include port 4 of VLAN 1. A fourth membership group 364 ("Group D") is defined to include ports 7 and 8 of VLAN 1 and ports 10 and 11 of VLAN 2. A fifth membership group 365 ("Group E") is defined to include port 14 of VLAN 2.

The ports of each membership group may send packets to one another within a group according to regular forwarding and security logic, but packets attempting to cross membership groups, e.g., Groups A, B, C, D, and E, get mirror-stolen to the CF 341 for processing. In this manner, port(s) can be configured according to group types for particular port access rights. For example, certain port(s) may be associated with an access point controller (APC), e.g., 123 in FIG. 1, providing connections for wireless networks. In certain scenarios, a wired LAN-based network may wish to treat each of the port(s) associated with the AP as belonging to an "untrusted", e.g., suspect, group. And, in this scenario the wired LAN-based network may wish to treat its wired LAN based port(s) as belonging to a "trusted", e.g., non-suspect, group. In this example, as described in more detail below, packets traversing the wired LAN would not be processed by the CF 341 before forwarding them, while packets traversing to or from the APC would be processed by the CF 341 before forwarding. As noted above, membership groups may contain a number of ports from 1 to "N". In treating each group as a set of ports, other topologies besides wireless security use can make use of the same mechanism provided by the embodiments described herein.

According to embodiments, if a particular group, e.g., port(s), are configured to be egress mirrored and stolen for a particular mirror group, then in addition to returning an "OUT_MIRROR" bit status in the Buffer Reply (e.g., bit field 714 as described in connection with FIGS. 7A-7B), the port(s) will be "masked" (as described below in connection with FIGS. 4-5C) from an outgoing port list. According to embodiments, in order to allow these packets to be easily re-forwarded by the CF 341, a "REFORWARD" bit status is set when a packet arrives back from the CF 341 (or network appliance 250-1) and sent in the buffer request (e.g., bit field 613 in FIG. 6A), for a particular mirror group, e.g. Group A, then a given packet only goes out port(s) designated as egress mirrored for that particular group, e.g., ports other than Group A, for which access was previously denied.

Embodiments of the present invention build upon earlier patented work disclosed in U.S. Pat. No. 7,103,045, which is commonly assigned, entitled, "System and Method for Forwarding Packets", by inventors Bruce LaVigne, et. al., and which issued Sep. 5, 2006. The same is incorporated herein by reference. As described in the above patent, packets are processed on ingress to determine a number of filter indices, which are then used on egress to determine exactly to which port(s) the data packet traffic should go. Further example of the same is provided next in connection with FIGS. 4-5C.

Figure 4:
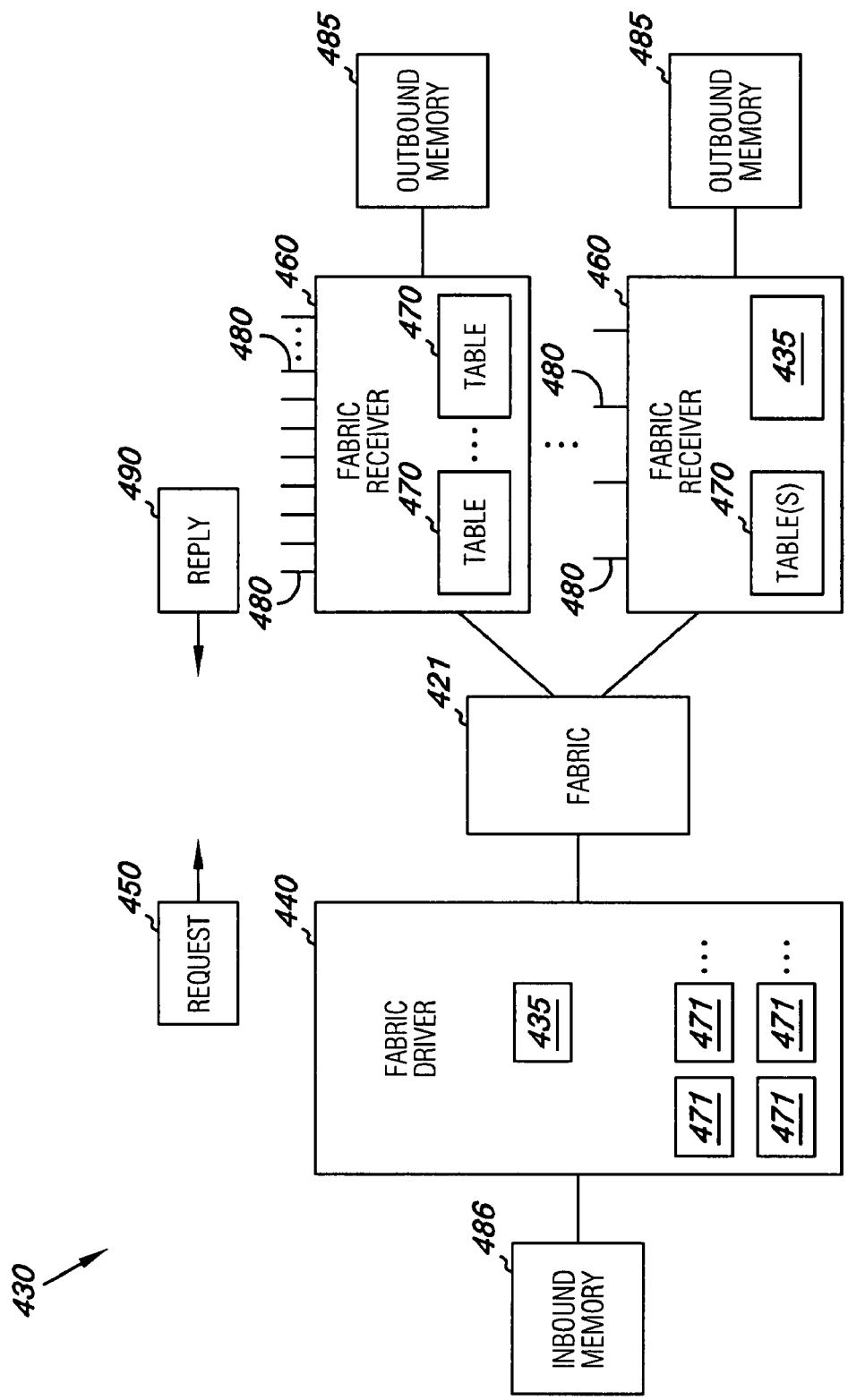
FIG. 4 is another block diagram embodiment logically illustrating components within a network device, such as network devices shown in FIG. 2.

FIG. 4 is another block diagram embodiment logically illustrating components within a network device, such as network devices, e.g., 218-1, shown in FIG. 2. The embodiments of FIG. 4 represents logically the components on the network chips themselves, e.g., 340-1, . . . , 340-N in FIG. 3 and 240-1, . . . , 240-N in FIG. 2, as well as within the forwarding fabric, e.g., forwarding fabric (F) 339 of FIG. 3 and crossbar fabric 239-1, . . . , 239-N in FIG. 2. As explained in connection with FIG. 3, a given network device 318 may have a number of network chips, e.g., 340-1, . . . , 340-N, resident thereon. The fabric 339 of FIG. 3 includes the logic to forward packets between the number of network chips, 340-1, . . . , 340-N, on the given network device 318.

In the embodiment of FIG. 4, the logical components 430 include hardware in the form of ASICs. As shown In FIG. 4 a fabric driver, 440 (e.g., "first logical component") includes logic on a given network chip, e.g., 340-1, . . . , 340-N in FIG. 3, that creates a buffer request 450 for buffer space when it has a packet that is to be forwarded on one or more ports 480 of a given network chip, e.g., ports 220-1, . . . , 220-P in FIG. 2, and ports 1, 2, 3, . . . , 14, etc., on chips 340-1, . . . , 340-N in FIG. 3.

As shown in FIG. 4, the buffer request 450 is sent to a fabric receiver, 460 (e.g., "second logical component") on a given network chip, e.g., 340-1, . . . , 340-N that has one or more ports 480, e.g., ports 220-1, . . . , 220-P in FIG. 2, and ports 1, 2, 3, . . . , 14, etc., on chips 340-1, . . . , 340-N in FIG. 3, to which the packet is to be forwarded. The buffer request 450 contains a number of filter indices for specifying packet forwarding criteria. As one of ordinary skill in the art will appreciate, the fabric driver 440 also specifies values for the filters indices based on the packet to be forwarded. The values of the filter indices can be derived from packet information such as VLAN information, source address information, destination address information, ingress port information, egress port information, etc., as shown in connection with FIGS. 6A-6B. As one of ordinary skill in the art will appreciate, the fabric receiver 460 associated with a given network chip, e.g., 340-1, . . . , 340-N in FIG. 3, will be associated with a number of network port(s) 480, e.g., ports 220-1, . . . , 220-P in FIG. 2, and ports 1, 2, 3, . . . , 14, on chips 340-1, . . . , 340-N in FIG. 3.

Upon receiving a packet at inbound memory 486 to be forwarded on one or more ports 480, the fabric driver 440 creates the buffer request 450 to reserve space in the outbound memory 485. The number of ports 480 is coupled to outbound memory 485 in which the fabric driver 440 is requesting space for the packet. The fabric receiver 460 has filter tables 470 that specify which of the ports 480 are to receive the packet based on the filter values. The fabric receiver 460 determines which of the ports 480 are to receive the packet based on the table information and the filter values as described further in connection with FIGS. 5A-5C.

The filter indices in the buffer request 450 may be determined by the fabric driver 440 or by other logic (not shown). The filter indices may provide a way to limit which ports 480 receive the packet, without necessarily specifying the port(s) 480 in the buffer request 450. The filter indices may define which ports 480 are to receive the packets based on criteria, such as, for example, VLAN membership information, multicast group membership information, logical port information, trunk forwarding information, etc. The present invention is not limited to the filter indices described herein and is well suited to developing additional filter indices for some parameters that may affect forwarding decisions, such as, for example, Ethernet type, IP protocol, etc.

According to embodiments of the present invention, a "membership group" filter index is derived from membership group bit field, e.g. SA_SPARE_IDX 625 in FIG. 6B. The membership group bit field is purposefully defined and used in association with network packets to indicate a membership group for some ports, e.g., Groups A, B, C, D, and E as shown in FIG. 3. Once these filter indices reach the egress logic of a given chip, e.g., 340-1, . . . , 340-N in FIG. 3, they are configured to apply this membership group filter index. In some embodiments, the egress logic applies the membership group filter index last after other filters have been logically operated on. An example embodiment of applying the membership filter index in this manner is provided in FIGS. 5A-5C.

As explained in the example embodiment of FIGS. 5B-5C, if any port is filtered out due to use of the membership filter, then a packet has attempted to cross a boundary to a membership group that is different from the group from which it originated (e.g., crossing from Group A to Group B). While the packet will still be allowed to be sent to any ports which are members of the membership group, the packet may be filtered from any non-member membership ports, and an indication returned so the packet may be sent, e.g., mirror-stolen, to a checking functionality, e.g., the CF 341 in FIG. 3 or network appliance 250-1 in FIG. 2.

If the checking functionality is an intrusion prevention system (IPS) or similar device, the checking system may chose to allow the packet to be forwarded after the packet passes any checks. However, the packet must not be allowed to go to all possible destinations, since the member source ports would then get a duplicate packet. By indicating the packet is being re-forwarded (e.g., setting a status bit in field 613 of FIG. 6A), along with re-using the same filters (e.g., membership filter index derived from bit field SA_SPARE_IDX 625 in FIG. 6B), the egress logic of the fabric receiver 460 can invert the membership group filter value (port mask) derived from SA_SPARE_IDX, and send the packet only out those ports to which the packet was denied access on an earlier attempt.

One advantage afforded by some embodiments is the ability to efficiently use the limited bandwidth of a checking functionality, while at the same time not requiring the network topology to be constrained by artificial subnet or VLAN boundaries.

By using filter indices to specify forwarding criteria, the fabric driver 440 need not explicitly specify or even know the ports 480 that are to receive the packet(s). For example, the fabric driver 440 need not know which ports 480 are on a particular VLAN, only that whatever ports 480 are on the particular VLAN are to receive packet(s).

As shown in FIG. 4, the fabric receivers 460, which may be coupled to the fabric driver 440 via fabric logic 421, include one or more filter tables 470 containing port masks, shown in FIGS. 5A-5C. The fabric receivers 460 include logic to determine which ports 480 are to receive the packet based on the filter indices in the buffer request 450 and information in the filter table(s) 470. In this manner, the number of ports 480 on fabric receivers 460 can be changed over time without the fabric driver 440 needing to know about all the ports 480 on the receiver side. Furthermore, as noted above, not all fabric receivers 460 need have the same numbers of ports 480 and the ports 480 may have different characteristics, including different membership in some membership groups, different transmission rate capabilities (e.g., 10/100/1000 Mbit/sec., etc.). While the fabric driver 440 and fabric receivers 460 have been described above and are illustrated in FIG. 4 as separate blocks, they may be on the same physical component.

FIGS. 5A-5C illustrates logical operations on indexed filters, e.g., port masks, according to embodiments of the present invention. FIG. 5B illustrates an embodiment for original packet buffer request processing, such as processing the buffer request example shown in FIG. 6A-6B (here field 613 would be cleared). FIG. 5C illustrates an embodiment for re-forwarded packet buffer request processing such as processing a buffer request as shown in FIGS. 6A-6B (here field 613 set, e.g., REFORWARD)

FIG. 5A illustrates a table embodiment of port masks according to the present disclosure. As described in connection with FIG. 4, each of the fabric receivers 460 associated with a particular chip, e.g., 340-1, ..., 340-N, may have one or more filter table(s) 470 for each filter in the buffer request 450, although a filter table 470 may be used for more than one filter. FIG. 5A shows tables 570-1, ..., 570-M, including a VLAN filter table, a LOGICAL PORT filter table, etc., for chip 540-1 and shows tables 570-1, ..., 570-M, including a VLAN filter table, a LOGICAL PORT table, etc., for chip 540-N. Each table, 570-1, ..., 570-M, on a given chip may contain a port mask (e.g., "port mask") 510 for each filter index, e.g., index rows 0-7 shown in this example embodiment.

As used in the example embodiment of FIGS. 5A-5C the designator "M" represents that each fabric receiver, 460, associated with a given chip, 540-1, ..., 540-N, may contain a number of filter tables for some numbers of filters associated with the given chip. The number of filter tables associated with one fabric receiver may be different from the number of filter tables associated with another fabric receiver. As the reader will appreciate, the designator "N" represents that a number of network chips may be provided to any given network device, e.g., switch 218-1 in FIG. 2 and/or 318 in FIG. 3. The number designated by M may be more or fewer than the number designated by N.

Each port mask 510 may have a bit for each port 480 which the particular fabric receiver 460 supports. Having a bit set may mean that the corresponding port 480 should receive a packet for the criteria specified by the filter index. For example, if the filter index is associated with VLAN membership, a bit in the port mask 510 is set corresponding to each port 480 that is a member of the VLAN, e.g., VLAN 1 and/or VLAN 2 in the example embodiment of FIG. 3. In the embodiment of FIG. 5A, tables 570-1, ..., 570-M associated with chip 540-N are shown having four bit port masks 510 as may be suitable for the lower fabric receiver 460 in shown in the embodiment of FIG. 4, i.e., the lower fabric receiver is shown in FIG. 4 as having four ports 480. In the embodiment of FIG. 5A, tables 570-1, ..., 570-M associated with chip 540-1 are shown representing seven bits to a port mask 510. For ease of illustration, this could represent the first seven bits of a port mask 510 with the remaining bits not shown so as not to over clutter the drawing. If, for example, there were 24 ports 480 associated with the fabric receiver of chip 540-1, there could be a 24 bit port mask 510 in the tables 570-1, ..., 570-M associated with chip 540-1.

FIG. 5A illustrates two example filter tables, e.g., a VLAN table and a LOGICAL PORT filter table, associated with two different chips, 540-1 and 540-N, to demonstrate how the bit port masks 510 may function. In operation, the fabric driver 440 in FIG. 4 creates a buffer request 450, also shown in more detail as 650-1 and 650-2 of FIGS. 6A and 6B. As shown in FIGS. 6A and 6B, the buffer request may contain a bit field pointer, e.g., a VLAN filter index VLAN_IDX 621, from which a VLAN filter value (port mask) can be derived. The buffer request may also contain a bit field, e.g., a logical port filter index LOGICAL PORT 614, from which a LOGICAL PORT filter value (port mask) can be derived. The filter indices contained in the bit fields, e.g., 621 and 614, will be used to index into each filter table, respectively, to return a filter value (port mask). For example, in FIG. 5A a circle surrounds a VLAN filter value (port mask) 510 corresponding to an index (VLAN_IDX) of 4 in association with the VLAN table 570-1 of chip 540-1. Similarly a circle surrounds a LOGICAL PORT filter value (port mask) 510 corresponding to an index (PORT_IDX) of 7 in association with the LOGICAL PORT table 570-M of chip 540-1.

After receiving the buffer request 450, the fabric receiver 460 indexes a respective port mask within tables 570-1, ..., 570-M associated with a given chip, e.g., 540-1 and 540-N, performs a logical AND of index results (port masks). For example, using index 4 in association with VLAN filter table 570-1 associated with chip 540-1 produces a port mask 510 of "0000001", e.g., for the first seven bits of what could be a twenty-four bit (24-bit) mask, etc. Indexing table 570-M with a using index of 7 in association with LOGICAL PORT filter table 570-M associated with chip 540-1 produces a port mask 510 of "0001111" for the first seven bits of what could be a 24-port mask or fewer or greater. Performing a logical AND of these two port masks 510 produces a value of "0000001", indicating that the seventh port from the left should receive the packet. Using those same indexes, e.g., 4 and 7, in association with the VLAN filter table 570-1 and the LOGICAL PORT filter table 540-M associated with chip 540-N produces port masks 510 of "0100" and "1100". Performing a logical AND of these two bitmasks produces a value of "0100", indicating that only the second port from the left should receive the packet. The fabric receivers 460 may perform this operation in parallel and independent of each other in the case that multiple fabric receivers are processing buffer request commands 450.

As shown in FIG. 4, the fabric driver 440 also may have one or more tables 471 containing information for specifying which of the fabric receiver(s) 460 are to receive the buffer request command 450 based on the filter indices. The fabric driver 440 may index these table(s) 471 with the filter indices and may perform a logical operation on the index result values (port masks) to determine which fabric receiver(s) 460 are to receive the buffer request command(s) 450. In this fashion, the fabric driver 440 may also be able to limit to which fabric receivers 460 it sends buffer request commands 460. Embodiments of the present invention are not limited to any particular number of filter tables and/or filter indices used in performing such a logical AND operation on the results from indexing a certain group of such tables.

According to embodiments, another logical AND operation may be subsequently applied to include a filter value (port mask) indexed to a membership group filter table once the filter indices reach the egress chips, e.g., fabric receivers, before forwarding a packet to one or more ports. The number of ports 480 to receive a given packet may be limited to any suitable degree by selection of particular filter values (e.g., "port masks"). As the reader will appreciate, embodiments are not limited to combining the results from indexing particular tables by performing a logical AND, other logical operations may additionally be used.

Figure 7A:
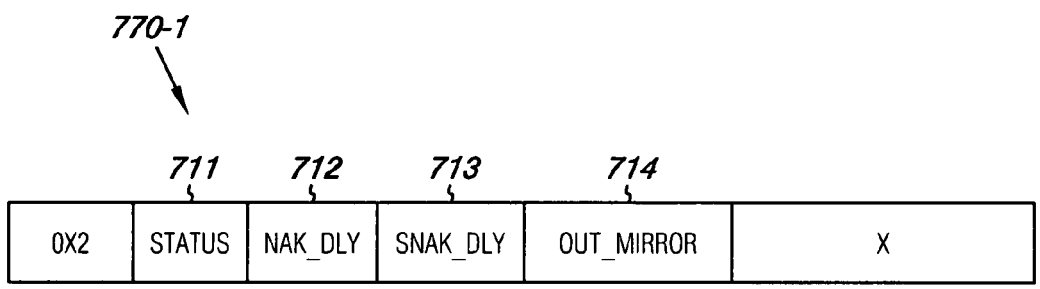
FIGS. 7A-7B illustrates an embodiment of a buffer reply command.
Figure 7B:
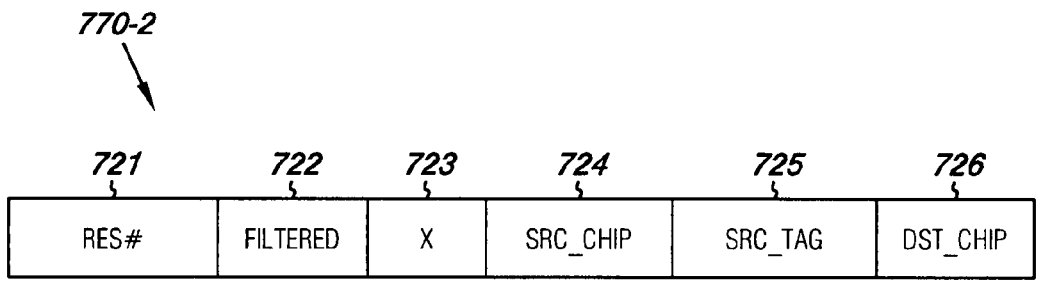

As described above, the fabric receiver 460 associated with a given network chip, e.g., 540-1, . . . , 540-N, will generate a buffer reply 490, shown as 770-1 and 770-2 of FIGS. 7A and 7B, containing a bit field, e.g., 714 in FIG. 7A, which indicates whether a particular packet has crossed a "per-egress mirror group membership" and other fields in the buffer reply, such as 711 indicate whether fabric driver 440 should send the packet(s) to one or more ports 480 coupled to the fabric receiver 460. As used herein, a "per-egress mirror group membership" means a particular membership group, and that membership group has been designated to "mirror-steal" packets to a checking functionality, e.g., network appliance 250-1 in FIG. 2 or CF 341 in FIG. 3, when a packet is attempting to cross a boundary of the given membership group, e.g., GROUP A membership group 361.

Hence, a per-egress mirror group membership can be defined according to ports being grouped into membership groups. The membership groups can make use of a filter index derived from a membership group bit field, e.g., SA_SPARE_IDX 625 in FIG. 6B, associated with a given packet.

As described in more detail below, if the membership group bit field, e.g., SA_SPARE_IDX 625 in FIG. 6B associated with a given packet indicates the packet is attempting to cross a boundary of the membership group, e.g., requesting access to one or more ports outside of the defined source port group membership, e.g. GROUP A in FIG. 3, the logic can deny access to ports outside of the port's defined source port group membership, e.g. GROUP A in FIG. 3. Thus, the logic will mirror-steal the packet to the checking functionality while allowing the packet to be sent to ports within the group membership, e.g., within GROUP A in FIG. 3.

According to embodiments, in order to mirror-steal the packet which is attempting to cross a boundary of the membership group, the logic will set one or more bits in an OUT_MIRROR bit field (714 in FIG. 7A) in the buffer reply, e.g., 770-1 and 770-2 as shown in FIG. 7A-7B.

To further illustrate one example operational embodiment, reference is made to FIG. 3 and to FIGS. 5B and 5C. In this example, it is assumed that ports 1-8 in FIG. 3 are in the same VLAN, e.g., VLAN 1. According to this example operational embodiment, if a packet came in port 1 and was flooded out its VLAN, e.g., VLAN 1, as the same will be known and understood by one of ordinary skill in the art, the packet would normally go out ports 2, 3, 4, 5, 6, 7, and 8. The packet will not exit the port, e.g., port 1, on which it arrived.

In this example embodiment, an ACL lookup can be configured to derive the membership filter index for a packet (e.g., SA_SPARE_IDX 625 in FIG. 6B) based on the ingress port of the packet. That is, if an ACL lookup is configured to set SA_SPARE_IDX 625 bit field based on ingress port, then this packet would have a SA_SPARE_IDX filter mask associated with ports 1, 3, and 6 (e.g., in connection with Group A's ports 361 being associated with a wireless network and an AP).

As described in connection with FIGS. 4 and 5A, when the some filter indices are being processed a certain number of filter tables, e.g., including VLAN membership, LOGICAL PORT information, multicast information, etc., for the flooded packet may result in ports 2, 3, 4, 5, 6, 7, and 8 being set for packet receipt, e.g., as members of VLAN 1. However, according to embodiments, a SA_SPARE_IDX filter index would also be used to derive a filter index which subsequently indexes to the membership group filter table to port mask and deny packet access to ports 2, 4, 5, 7 and 8, as being non-member ports to port 1's membership in Group A (ports 1, 3, and 6). As shown in FIG. 3, ports 2, 4, 5, 7, and 8 are members of different membership groups, e.g., 362-365 (Groups B-E).

According to embodiments, logic in the fabric receiver, e.g., 460 in FIG. 4, can detect whether a particular packet received by a particular port, belonging to a particular membership group which has been configured to be egress mirrored, e.g., GROUP A, using buffer request command bit field SA_SPARE_IDX 625 in FIG. 6B, and is attempting to cross the boundary of the membership group. If so the logic will set one or more bits in an OUT_MIRROR bit field (714 in FIG. 7A) in the buffer reply, e.g., 770-1 and 770-2 as shown in FIG. 7A-7B, and filter the packet to deny access to ports outside the membership group, e.g., ports 2, 4, 5, 7, and 8. The logic will set the OUT_MIRROR bit field (714 in FIG. 7A) in a manner which indicates that the packet needs to be mirror-stolen. The logic, however, will allow the packet to be sent to ports which are members of the membership group, e.g., ports 3 and 6, without passing through the checking functionality.

Logic in the fabric driver 440 will then mirror-steal this packet to the checking functionality based on the OUT_MIRROR bits set in the reply (714 in FIG. 7). To mirror steal this packet to the checking functionality, the logic can copy the packet and then may encapsulate the packet, e.g., using generic routing encapsulation (GRE), etc, to send the copied packet to the checking functionality. Other encapsulation techniques include Ethernet-within-IP (RFC3378), Layer 2 Tunneling Protocol (L2TP-RFC3931), etc. In some embodiments the logic will encapsulate and secure tunnel the packet to a network appliance located elsewhere in the network, e.g., 250-1 in FIG. 2. In alternative embodiments, the logic can copy the packet and forward the packet to a CF 341 local to the network device as described in connection with FIG. 3.

The checking functionality may then check the packet and decide whether the packet is OK to be sent to ports outside of the membership group. As the reader will appreciate the checking functionality can also drop the packet if the packet is not approved. If the checking functionality approves the packet, the checking functionality can optionally re-encapsulate the network packet and send it back to the originating device (e.g., chip 340-3 in the case of a CF 341 local to the network device) where it is flagged for a re-forwarding operation (e.g., by setting the REFORWARD flag 613 in the newly generated buffer request 450). Egress logic, e.g., fabric receiver 460, on a network chip receiving such a re-forwarded packet will only send the packet out of ports which were previously denied, e.g., ports 2, 4, 5, 7, and 8, otherwise ports 3 and 6 will receive a duplicate packet.

FIG. 5B illustrates an embodiment for original packet buffer request processing, e.g., processing of buffer request 650-1 and 650-2 FIGS. 6A-6B. FIG. 5B illustrates a number of filter indices, e.g., VLAN_IDX 1 (570), IN_LOGPORT MATCH (574), etc., having an associated port mask for each fabric receiver, e.g. network chips 540-1, 540-2, 540-3, . . . , 540-N. As described above a logical AND operation can be performed on the port masks associated with a first particular group of filter indices, e.g., 570-1 and 570-N, to produce filter results 575 before including the membership filter 525, e.g., SA_SPARE_DX 4. According to embodiments, another logical AND operation is subsequently performed on the result from all the earlier port masks, now including the port mask resulting from the membership filter 525, to produce resulting port mask 576. For example, logically speaking filter results 575=570 AND 574 AND (any other filter port masks); 576=575 AND 525; 577=575 AND (NOT 525); OUT_MIRROR=|577 (wheren "|" represents a bit-reduction OR, i.e., results in a "1" if any bit is set in 577).

As shown in FIG. 5B if any bit is set in the ports masked by the membership filter 525 (SA_SPARE_IDX 4) the buffer reply will return an OUT_MIRROR bit (714 in FIG. 7A). In this manner, the packet will be denied to particular ports outside of the boundary of the membership group as shown by ports masked by SA_SPARE 577. In the example given above, this would include ports 2, 4, 5, 7, and 8 which are outside of the membership group of Group A (ports 1, 3, and 6 in FIG. 3).

FIG. 5C illustrates an embodiment for re-forwarded buffer request processing, e.g., processing of a buffer request 650-1 and 650-2 where the REFORWARD flag 613 is set. As in FIG. 5B, FIG. 5C illustrates a number of filter indices, e.g., VLAN_IDX 1 570, IN_LOGPORT MATCH 574, etc., having an associated port mask for each fabric receiver, e.g. network chips 540-1, 540-2, 540-3, . . . , 540-N. Again, a logical AND operation can be performed on the port masks associated with a first particular group of filter indices to produce filter results 575 before including the membership filter SA_SPARE_IDX 4. Logic on the receiving network chip will then invert the membership filter value (port mask) 525 (SA_SPARE_IDX 4 from FIG. 5B) to produce "inverted" membership filter value (port mask) 578 (SA_SPARE_IDX 4 INVERTED).

The inverted SA_SPARE_IDX 4 value (port mask) then undergoes another logical AND operation along with the filter results 575 from the other filter indices, e.g., 570 and 574. This subsequent logical AND operation produces a resulting port mask 579 (e.g., "port mask") which will allow the re-forwarded packet to only go to ports which have not already received the packet. In this example, the resulting port mask 579 will allow the re-forwarded packet to be sent to ports 2, 4, 5, 7, and 8, to which the packet had previously been denied. Using the resulting port mask 579, the logic will additionally prevent the packet from going to ports 3 and 6, which are now filtered, but which had previously sent the packet since they are members in the particular membership group, e.g., Group A (ports 1, 3, and 6) in FIG. 3.

Although the example embodiments discussed herein describe herein illustrate the same membership filter (SA_SPARE_IDX 625 in FIG. 6B) being used by each packet in a membership group, the embodiments are not so limited. One of ordinary skill in the art will appreciate the manner in which different membership filters, e.g., SPARE2_IDX 629 in FIG. 6B, could be used by different packets within a different set of membership groups to allow asymmetric forwarding and "mirror-stealing" status as well.

FIGS. 6A-6B illustrates an embodiment of a buffer request command, e.g., buffer request command 450 in FIG. 4. FIGS. 6A-6B form one buffer request command, shown as 650-1/650-2. In the embodiments shown in FIGS. 6A-6B, the two buffer request commands, referred to collectively as 650, may both be sent as a part of a single exchange. However, embodiments of the present invention are not limited to using two buffer request commands 650 per exchange. For example, the format of the buffer request command 650 may allow all information to be passed in a single buffer request command, or it may be spread across more than two commands.

In FIG. 6A the first half 650-1 of the first buffer request command can include a re-forward status bit field, e.g., REFORWARD bit field 613, which may be one or more bits, to indicate that a packet associated with the buffer request command is being re-forwarded, as described above and in reference to the operation of FIGS. 5A-5C. The first half 650-1 of the buffer request command 650 has a LOGICAL PORT field 614, i.e., containing logical port information, which may be for logical port number and may allow certain traffic to be stopped, for example, if the source equals the destination.

In FIG. 6B the second half 650-2 of the buffer request command 450 includes the VLAN_IDX field 621 which may be used for specifying a VLAN filter index. As the reader will appreciate, these and other filter indexes can be used by the fabric receiver, e.g., 460 in FIG. 4, to index a particular table of port masks. According to embodiments, the SA_SPARE_IDX field 625 in FIG. 6B is used to define a filter index in association with a network packet to indicate a packet's membership in a particular membership group.

As the reader will appreciate, many different header fields may be included in association with some buffer request command frame 650-1 and 650-2. As shown in the embodiment of FIG. 6, the header fields, from which additional filter indices may be derived includes a bit field header SPARE2_IDX 629. Header field SPARE2_IDX, as well as any number of other fields, may also be used to derive information associated with a given membership group. Embodiments are not limited to the examples shown in FIGS. 6A-6B.

FIGS. 7A-7B illustrates an exemplary buffer reply command split between a first half 760-1 and a second half 770-2. The first half 770-1 of the buffer reply command includes a status field 711 and delay fields 712 and 713. As the reader will appreciate some status may be maintained in a status table, and each status may have a particular value and meaning, as the same will be known and understood by one of ordinary skill in the art. As discussed herein, the fabric receiver, e.g., 460 in FIG. 4, may indicate by use of the status and delay fields, 711-713, whether a packet should be sent now, sent later, or dropped, etc. As shown in FIG. 7A the first half 770-1 of the buffer reply command can include an OUT_MIRROR bit field 714, which may be one or more bits, to indicate that a packet associated with a particular port or ports, e.g., belonging to a particular membership group, is flagged to be egress mirrored and stolen.

According to embodiments, if a particular packet is attempting to cross a boundary of a membership group, then non-member ports of the particular source membership group will be masked from the outgoing port list using a membership filter value derived from the membership filter bit field (SA_SPARE_IDX 625 in FIG. 6B) in order to deny packets access to these ports and the OUT_MIRROR bit field 714 will be set in the buffer reply 770-1 and 770-2 to indicate that the packet requesting access to these ports needs to be been mirror-stolen to a checking functionality. Embodiments are not limited to the examples shown in FIGS. 7A-7B.

As described above in connection with FIG. 3, embodiments of the present invention group a number of ports into a membership group, e.g., 361, . . . , 365. A filter index, e.g., SA_SPARE_IDX 625 in FIG. 6B, is defined in association with a network packet to indicate the membership group in order to detect if a packet is attempting to cross a boundary of the source membership group. The number of ports can be grouped into a membership group based on a set of criteria. The criteria can include a source/destination port pair, a media access controller (MAC) source address, an IP source address, an access control list (ACL) entry, etc. As described herein packets crossing a boundary of a membership group can be "mirror-stolen" to a checking functionality.

One example for implementation of the some embodiments includes usage between wireless and wired networks. As shown in FIG. 1, a number of clients e.g., wireless devices 121 in FIG. 1, may connect to a wired network through an access point (AP) and an access point controller, e.g., 119 and 123 in FIG. 1. According to some embodiments, each APC 123 may belong to an "untrusted" (meriting monitoring by a checking functionality) group, e.g., a wireless membership group which could be defined as Group A, 361, in the example embodiment of FIG. 3. By contrast, other ports may given membership in a "trusted" group (not meriting monitoring by a checking functionality), e.g., one or more wired LAN membership groups which could be defined within Groups B, C, D, and E, 362, . . . , 365, in the example embodiment of FIG. 3. In this example, packets traversing the wired LAN, e.g., with membership in Groups B, C, D, and E (362, . . . , 365) may not be passed through the checking functionality (although packets passing from one wired group to another, e.g., Group B to C, will also be passed to the checking functionality). However, all packets to or from an APC, 123 in FIG. 1, e.g., with membership in Group A (361) would be passed through the checking functionality before forwarding the packets. As described in connection with the example embodiment of FIG. 3, membership groups 361, . . . , 365 (Groups A-E) can contain any number of ports, e.g., 1-"N". As the reader will appreciate, by thinking of each group, e.g., 361, . . . , 365 (Groups A-E) as a set of ports, other topologies besides usage between wireless and wired networks can benefit from the present embodiments, e.g., more public areas of a company site, such as visitor cubes, reception areas, conference rooms, etc.

By way of illustration and not by way of limitation, one implementation may include each fabric receiver having nine (9) filter tables, one table for each of nine certain filter types to a particular implementation, and each table containing a port mask ("port mask") 510 for each filter index. According to this example embodiment, the ninth (9$^{th}$) table could represent the membership group filter table, having membership group filter values ("port masks") which can be indexed based on a particular membership group filter index derived from a membership filter bit field, e.g., SA_SPARE_IDX 625 described in FIG. 6B.

As described in connection with FIGS. 5B and 5C, one logical AND operation may be performed on eight (8) filter values upon processing of the buffer request. A subsequent logical AND operation, e.g., including the result of the AND operation on the first eight (8) filter values along with filter value (port mask) indexed by a membership group filter index can be performed in order to detect if a particular packet is attempting to cross a boundary of a membership group.

Figure 8:
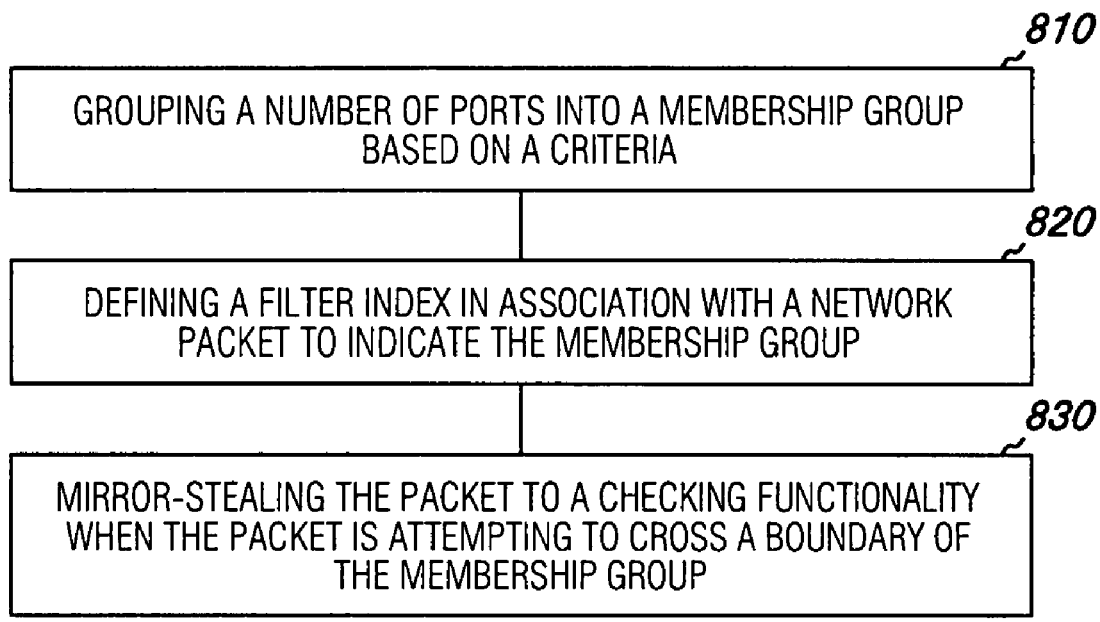
FIG. 8 illustrates a method for packet processing according to an embodiment of the present invention.

FIG. 8 illustrates a method for packet processing according to an embodiment of the present invention. As shown in the embodiment of FIG. 8 at block 810, the method includes grouping a number of ports into a membership group based on a criteria. At block 820, the method includes defining a filter index in association with a network packet to indicate the membership group. The method further includes mirror-stealing the packet to a checking functionality when the packet is attempting to cross a boundary of the membership group, as shown in block 830. Logic, which is operable to perform the method described in connection with FIG. 8 can be present in whole or in part in embodiments of other figures. Embodiments, however, are not limited to the example given herein.

It is to be understood that the above description has been made in an illustrative fashion, and not a restrictive one. Although particular embodiments have been illustrated and described herein, those of ordinary skill in the art will appreciate that other component arrangements and device logic can be substituted for the particular embodiments shown. This claims are intended to cover such adaptations or variations of some embodiments of the disclosure, except to the extent limited by the prior art.

In the foregoing Detailed Description, some features are grouped together in a single embodiment for the purpose of streamlining the disclosure. This method of disclosure is not to be interpreted as reflecting an intention that any claim requires more features than are expressly recited in the claim. Rather, as the following claims reflect, inventive subject matter lies in less than all features of a single disclosed embodiment. Thus, the following claims are hereby incorporated into the Detailed Description, with each claim standing on its own as a separate embodiment of the invention.

What is claimed is:

1. A network device, comprising:
   a network chip including logic and a number of network ports for the device for receiving and transmitting packets therefrom; and
   wherein the logic is operable to:
   group a number of ports into a membership group based on a criteria;
   define a filter index in association with a network packet to indicate the membership group;
   use the filter index to detect if the network packet is attempting to cross a membership group boundary;
   filter the network packet to deny access to ports outside the membership group responsive to detecting that the packet is attempting to cross the membership group boundary;
   mirror-steal the network packet to a checking functionality responsive to detecting that the packet is attempting to cross the membership group boundary; and,
   forward the network packet to a port outside the membership group responsive to the checking functionality approving the network packet and encapsulating the network packet for forwarding back to the network device.

2. The device of claim 1, wherein the criteria includes criteria selected from the group of:
   a physical source port;
   a source media access controller (MAC_SA) address;
   a destination media access controller (MAC_DA) address;
   a source IP address (IP SA);
   a destination IP address (IP DA);
   a protocol ("traffic") type;
   a TCP/UDP source port number;
   a TCP/UDP destination port number;
   an IP flow; and
   a port being connected to a wireless network.

3. The device of claim 1, wherein the checking functionality includes a checking functionality selected from the group of:

an intrusion prevention system (IPS);
an intrusion detection system (IDS);
a counting device; and
an accounting device.

4. The device of claim 1, wherein the logic will allow the packet to be sent to a port which is a member of the membership group without passing through the checking functionality.

5. The device of claim 1, wherein a network chip receiving a forwarded packet includes logic to prevent the packet from being allowed to go to ports having already received the packet.

6. A network device, comprising:
a network chip including logic and a number of network ports for the device for receiving and transmitting packets therefrom; and
wherein the logic is operable to:
group a number of ports into a membership group based on a criteria;
define a filter index in association with a network packet to indicate the membership group;
use the filter index to detect if the network packet is attempting to cross a boundary of the membership group upon packet egress;
deny access to ports outside the membership group and mirror-steal the network packet to a checking functionality responsive to detecting that the network packet is attempting to cross the boundary; and,
forward the network packet to a port outside the membership group responsive to the checking functionality approving the network packet and encapsulating the network packet for forwarding back to the network device.

7. The device of claim 6, wherein the criteria includes criteria selected from the group of:
a source/destination port pair;
a media access controller (MAC) address;
an IP address; and
an access control list (ACL) entry.

8. The device of claim 6, wherein the checking functionality is located in the network in a location selected from the group of:
a location on an ingress network chip of the network device;
a location on a network chip different from the ingress network chip, but located on a same plug-in blade of the ingress network chip;
a location on a different plug-in blade from the same plug-in blade of the ingress network chip;
a location for a plug-in appliance which is attached locally to the network device; and
a location which is remote from the network device.

9. The device of claim 6, wherein the logic will allow the packet to be sent to a port which is a member of the membership group without passing through the checking functionality.

10. The device of claim 6, wherein:
a network chip on the network device receiving a forwarded packet includes egress logic to send the packet only out of ports which were previously denied.

11. The device of claim 10, wherein:
returned packets are forwarded with the filter index along with having a forward status bit set; and
wherein the egress logic inverts a filter value associated with the filter index to send the packet only out of ports which were previously denied.

12. A method for processing packets, comprising:
grouping, by logic of a networking device, a number of ports into a membership group based on a criteria;
defining, by the logic of the networking device, a filter index in association with a network packet to indicate the membership group;
mirror-stealing, by the logic of the networking device, the packet to a checking functionality when the packet is attempting to cross a boundary of the membership group;
using, by the logic of the networking device, the filter index to detect if the network packet is attempting to cross a membership group boundary;
filtering, by the logic of the networking device, the network packet to deny access to ports outside the membership group responsive to detecting that the packet is attempting to cross the membership group boundary;
mirror-stealing, by the logic of the networking device, the network packet to a checking functionality responsive to detecting that the packet is attempting to cross the membership group boundary;
forwarding, by the logic of the networking device, the network packet to a port outside the membership group responsive to the checking functionality approving the network packet and encapsulating the network packet for forwarding back to the network device.

13. The method of claim 12, wherein the method includes:
dropping the packet if the packet is not approved by the checking functionality.

14. The method of claim 13, wherein the method includes allowing the packet to be sent to a port which is a member of the membership group without passing through the checking functionality.

* * * * *